Figure 4:
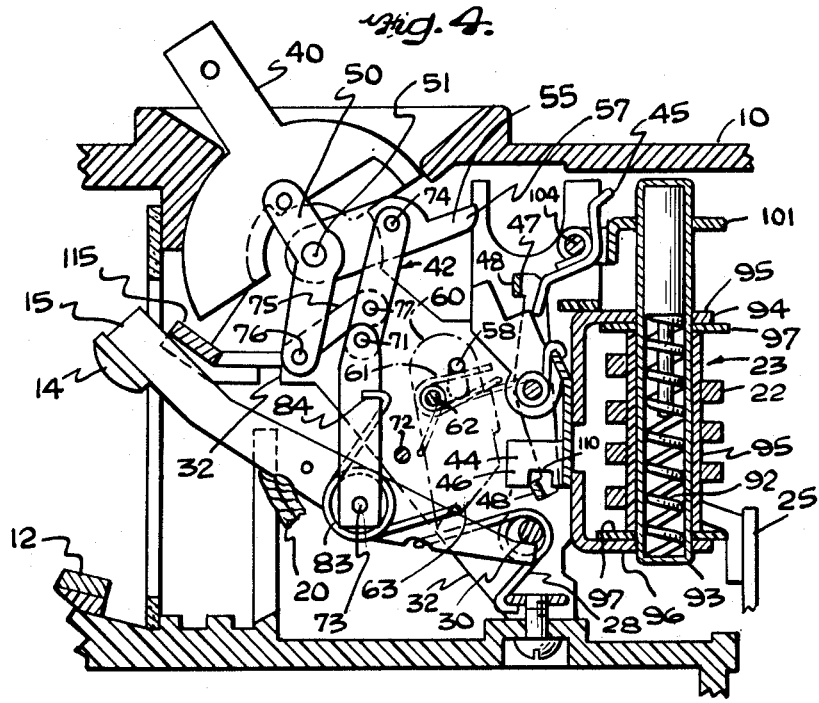

July 6, 1965  J. S. HOLLYDAY  3,193,736
ELECTROMAGNETIC CIRCUIT FOR CIRCUIT BREAKERS
Filed Sept. 8, 1961  4 Sheets-Sheet 1
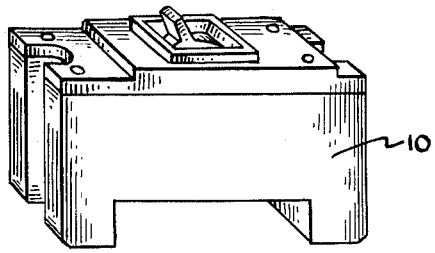
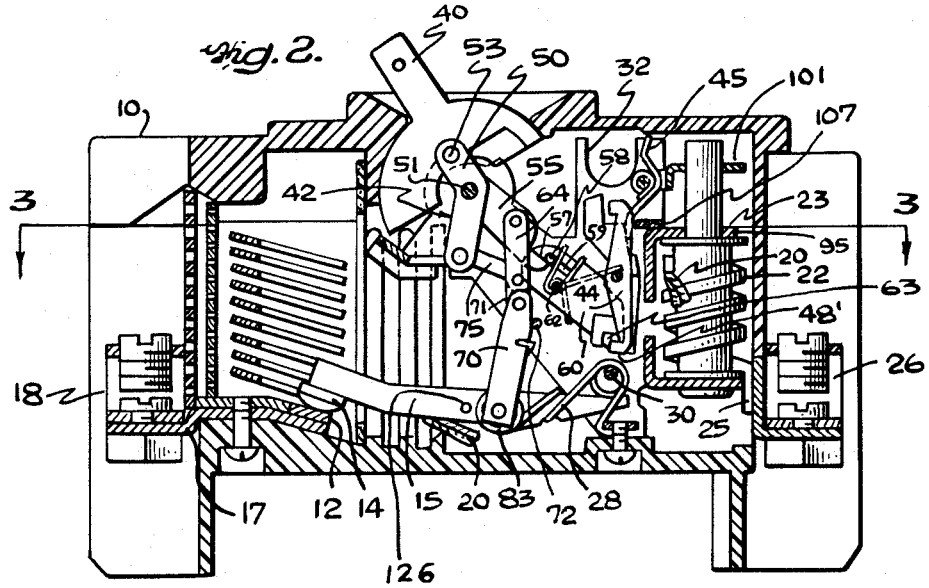
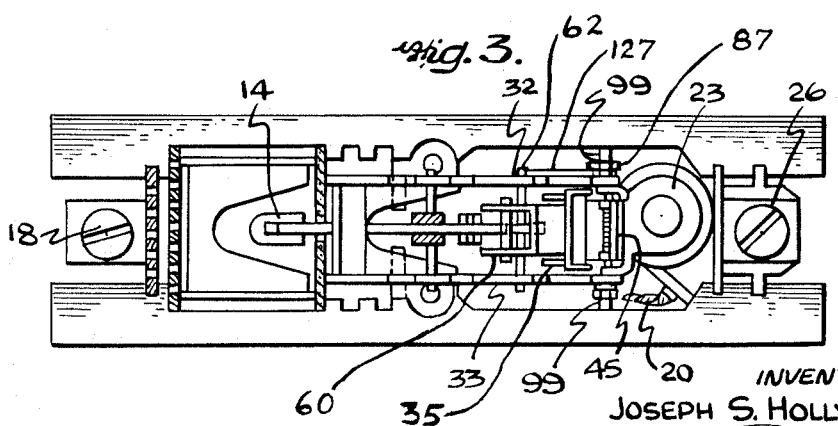
INVENTOR
JOSEPH S. HOLLYDAY
BY
HIS ATTORNEY INVENTOR.
JOSEPH S. HOLLYDAY
BY
Joseph G. Dennyson
HIS ATTORNEY July 6, 1965   J. S. HOLLYDAY   3,193,736
ELECTROMAGNETIC CIRCUIT FOR CIRCUIT BREAKERS
Filed Sept. 8, 1961   4 Sheets-Sheet 3

INVENTOR.
JOSEPH S. HOLLYDAY
BY
HIS ATTORNEY

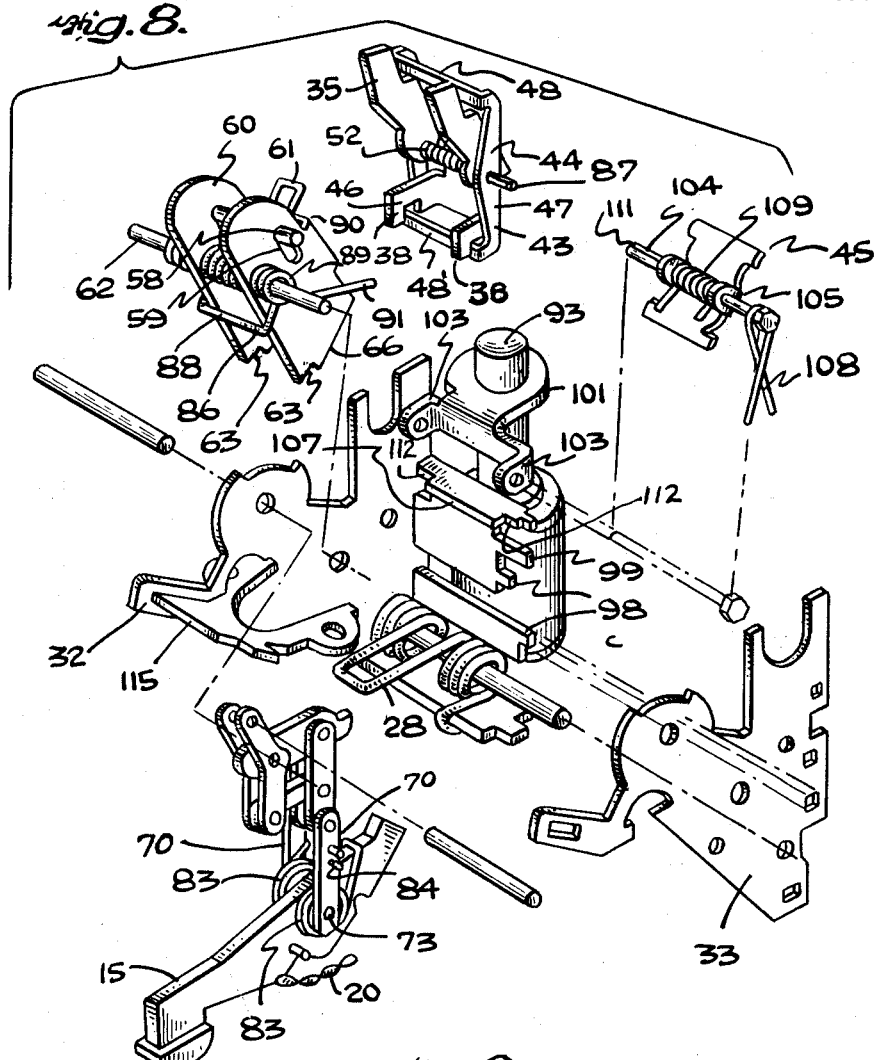

3,193,736
**ELECTROMAGNETIC CIRCUIT FOR
CIRCUIT BREAKERS**
Joseph S. Hollyday, Pennington, N.J., assignor to Heinemann Electric Company, Trenton, N.J., a corporation of New Jersey
Filed Sept. 8, 1961, Ser. No. 137,488
13 Claims. (Cl. 317—177)

This invention relates to electrical circuit breakers and, more particularly, to an improved electromagnetic arrangement whereby a time delay period is established at excessive overload currents so that the instantaneous tripping of the circuit breaker occurs only at current values which are very high. It is an object of the present invention to provide an electromagnet with an improved arrangement of plural armatures to result in a higher instantaneous trip current value as compared to previous similar size electromagnets.

Also, it is desirable to have an arrangement for instantaneously tripping the circuit breaker at a trip current value as determined by an initial setting of an armature. It is another object to provide an armature arrangement which may be set to trip instantaneously at various current levels.

In this invention, two balanced pivotal armatures are associated with an electromagnetic coil disposed about a tube containing a movable core of magnetic material. The core is biased toward one end of the tube and upon suitable energization of the coil is moved by the magnetic flux toward the other end of the tube. Associated with the coil are a main frame and a shunting frame. The main frame, a portion of the core, a portion of the main armature, and certain air gaps, some of which are initially large define a main path for the magnetic flux when the coil is initially energized and the core is at the end of the tube toward which it is biased. Simultaneously, the shunting frame, and portions of the main frame, core, main armature and a shunting armature, together with small air gaps, define a shunting path for the magnetic flux created by the coil. The ends of the main and shunting armatures nearest to each other are disposed sufficiently close to each other to be in magnetically coupling relation with each other whereby the shunting frame restrains movement of the main armature below a certain magnetic attraction on the main armature.

At predetermined current levels above rated current, for instance above between 110% and 125% of rated current and below 2,000%, the main flux path is sufficiently strong to start movement of the core. If the overload continues, as the core moves against its bias and the retarding action of the fluid within the tube, the main flux path increases in magnetic attraction while that of the shunting flux path decreases, because one of the large gaps in the main circuit is being decreased. The main armature, due to magnetic attraction, tends to move toward the main frame in the direction to close an air gap, but it is restrained from so moving by its magnetic coupling with the shunting armature and a spring bias. Eventually the magnetic attraction on the main armature becomes sufficient to overcome the magnetic coupling and the spring bias on the main armature, and rotates the main armature into abutment with the frame for unlatching the linkage of the circuit breaker.

At very high overload currents, for instance at about 2,000% or above, the magnetic attraction upon the main armature is sufficient to immediately rotate the main armature in the direction to unlatch the circuit breaker linkage, against the restraint of the magnetic coupling and the spring bias, but the instantaneous current level at which this takes place is very high compared to what it would be were only the main armature used.

The foregoing and other objects of the invention, and the best mode in which I have contemplated applying such principles will more fully appear from the following description and the accompanying drawings in illustration thereof.

Figure 5:
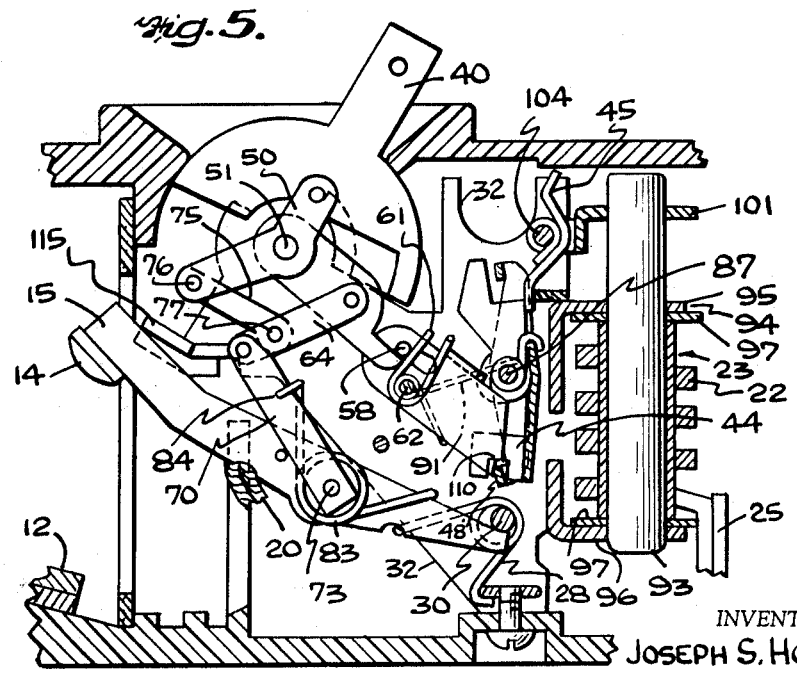
Figure 6:
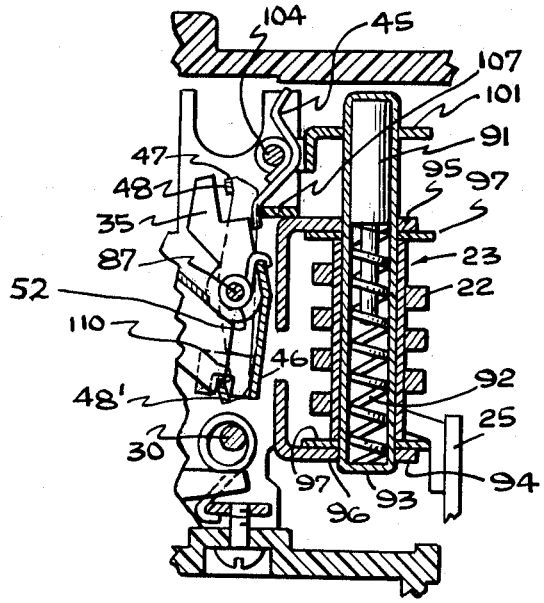
Figure 7:
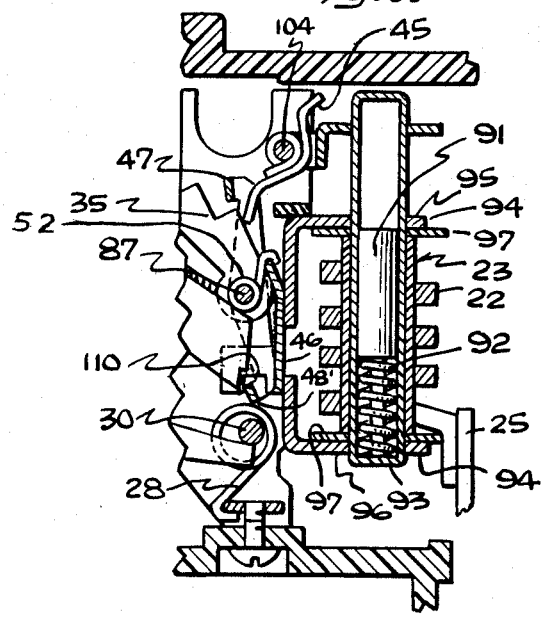

In the drawings:
FIG. 1 is a perspective view of a circuit breaker embodying this invention;
FIG. 2 is a view partly in section and partly in elevation of a circuit breaker incorporating my invention with the linkage illustrated in the closed position of the contact;
FIG. 3 is an elevation taken along the lines 3—3 in FIG. 2;
FIG. 4 is a view of the circuit breaker illustrated in FIG. 1, which is similar to FIG. 2, but this view illustrates the linkage in the tripped position of the contacts before automatic resetting due to a current level in the core sufficiently high to instantly trip the circuit breaker;
FIG. 5 is a view of the circuit breaker illustrated in FIG. 1, which is similar to FIG. 2, but this view illustrates the linkage in the open position of the contacts after automatic resetting;
FIG. 6 is a partial view illustrating the core and armatures in the closed position of the contacts;
FIG. 7 is a partial sectional view similar to FIG. 6 but illustrating the device after the coil has been energized sufficiently to move the core toward the lower end of the tube and after the time delay required to move the core its full extent;
FIG. 8 is an exploded view of the mechanism illustrated in FIG. 2, and
FIG. 9 is an exploded view of the main armature only.

This invention is embodied in a circuit breaker comprising a circuit breaker mechanism mounted within an insulating case 10 of suitable molded material. The case 10 encloses a stationary contact 12 having a flat contact face, and a movable contact 14 secured to a movable arm 15. The stationary contact 12 is connected by suitable terminal structure 17 to a connector 18, to which an external conductor may be secured. The movable arm 15 is connected by a flexible conductor 20 to a coil 22 of an electromagnet 23, the coil 22 having its other end connected to a terminal structure 25 and to a connector 26, to which a second external circuit conductor may be secured.

The movable contact arm 15 is biased by a spring 28 toward the open position of the contacts. The opening spring 28 biases the movable arm 15 toward the stationary shaft 30 which has its ends secured to similar parallel, and spaced frame plates 32 and 33, intermediate which is disposed the mechanism for operating the circuit breaker. The movable arm 15 is connected to (and manually operable by) a handle 40 through a linkage mechanism 42, the linkage mechanism 42 being electrically controlled by the electromagnet 23 and armature devices 44 and 45, upon predetermined electric currents, each of the armature devices 44 and 45 being independently balanced.

The main armature device 44, FIG. 9, is a two piece mechanism comprising a balanced, pivotal magnetizable inner body 46, having interconnected upper side legs 35, for pivoting a balanced outer latch 47, the latter comprising side plates 43 and top and bottom interconnecting bars 48 and 48', respectively, preferably of non-magnetizable material. The lower bar 48' (FIG. 2) restrainably engages the spaced, lock lips 63 of a cradle 60, the lower latch bar 48' being rotated counterclockwise out of engagement with the lock lips 63 upon predetermined overload currents by suitable engagement of the lower side legs 38 of the inner body 46 and the lower bar 48', the cradle 60 being pivotal about pintle 62 whose ends are carried by plates 32 and 33.

The linkage mechanism 42 connects the operating handle 40 to the movable arm 15 by five links, constructed and arranged as illustrated in the drawings, and described in detail in copending United States patent application Serial No. 109,914 filed May 15, 1961. Referring to FIG. 2, which illustrates the closed position of the contacts 12 and 14, the handle 40 is illustrated in its leftwardmost or contacts closed position having pivoted the associated handle link 50 to its most counterclockwise position about its pintle 51, the latter having its ends carried in suitable openings in the frames 32 and 33. The handle link 50 is connected to the handle 40 by a pintle 53 carried by the upper end of the link 50. The mechanism is restrained by a catch link 55, pivotally connected to the pintle 51 at one end and provided with a straight nose portion 57 at the other end for engaging a lock pin 58 carried in slots 59 of the cradle 60. The lock pin 58 is biased to the top of the slots 59 by a spring 61, FIGS. 4 and 5, for restrainably engaging the nose portion 57.

To connect the catch link 55 to the movable arm 15, a toggle is utilized, comprising upper and lower links 64 and 70. The upper link 64 comprises two members having their ends connected between the ends of the member forming the catch link 55 by a pintle 74, FIG. 4. The lower link 70 also comprises two members connected at their ends to the opposite sides of the movable arm 15 by another pintle 73. The knee of the toggle is formed by a pintle 71 and its overset (to the right) is limited by a pin 72 having its ends secured to the plates 32 and 33. The four bar linkage is completed by pivotally connecting the bottom portion of the handle link 50 to the upper link 64 by a cross link 75 and providing a pintle 76 for connecting the ends of the handle link 50 and the cross link 75 and, also, providing a pintle 77 for connecting the other end of the cross link 75 to the upper link 64, intermediate the ends of the latter.

Thus, the handle link 50, the catch link 55, the upper toggle link 64 and the cross link 75 form a four bar linkage in which each of the links are pivotally connected to the other and one of the links, the upper toggle link 64, is connected to a fifth link, the lower toggle link 70. Rotation of the handle 40 rotates the handle link 50 which, through the linkage just described, moves the contact 14 to the closed position, illustrated in FIG. 2, at which time the knee of the toggle is over center to the right and the handle is at its leftwardmost position.

Referring to FIG. 8, between each of the members forming the link 70 and the movable arm 15 are disposed the legs of a generally U-shaped automatic reset spring 83 having the base of the U biased against the upper side of the arm 15, the reset spring 83 having portions of its legs coiled about the pintle 73 on opposite sides of the arm 15. Also, the reset spring 83 has its ends 84 hooked over the two members forming link 70.

The cradle is approximately of channel shape in cross section and the pintle 62 about which it pivots is disposed intermediate the ends of the slots 59 but adjacent the lower end thereof. The right hand end of the cradle 60 freely interfits with (and the sides thereof are spaced from) the legs 38 of the main armature inner body 46. The spring 61 which biases the lock pin 58 to the top of the slots 59 is of generally U-shape with end portions coiled about the pintle 62. The mid-portion of the spring 61 adjacent the base of the U-shape is biased against the base 90 which connects the opposite cradle sides, FIG. 8, while the opposite ends of the spring 61 are biased against the lock pin 58.

A U-shaped cradle spring 88, FIG. 8, biases the cradle into engagement with the lower bar 48′ of the latch plate 47. The spaced plates of the cradle 60 which form the lips 63 are provided with straight surfaces 66 (FIG. 8) for pivoting the bar 48′ and allowing the lips 63 to slip behind the bar 48′ during automatic resetting if the bar 48′ has returned to reset position before the cradle 60. The cradle spring 88 has portions 89 coiled about the opposite ends of the pintle 62 between the sides of the cradle 60 and the frame plates 32 and 33, and extreme end portions 91 resting upon the pintle 87 about which the main armature device 44 rotates, and a spring base 86 engaging the cradle sides for biasing the cradle about the pintle 62 in the counterclockwise direction, the movement of the cradle 60 counterclockwise during resetting being initially limited by abutment of the upper right hand portions, FIG. 7, with the coils of the armature spring 52 and thereafter spaced from the coils of the spring 52 FIG. 6 due to the clockwise bias imposed on the cradle 60 by the catch link 55, FIG. 5.

The electromagnet 23, FIGS. 6 and 7 further comprises a tube 93, about the lower portion of which the coil 22 is wound, and a main frame 94 of magnetizable material also about the lower portion of the tube 93. Within the tube 93 is a movable core 91 of magnetizable material biased toward the top end of the tube 93 by a spring 92. The frame 94 has a U-shape, as illustrated and comprises two L-shaped legs or pieces 95 and 96, the vertical legs of which are spaced to define a gap and the horizontal legs of which have suitable openings through which the tube 93 extends, the coil 22 being disposed between the horizontal legs and to the right of the vertical legs. The tube 93 is preferably of non-magnetizable material, such as brass, electrically spaced from the coil 22 and the frame 94 by suitable insulators 97 and soldered to the horizontal frame legs to provide a mechanical connection thereto. The vertical legs of the frame 94 are provided with lugs 98 (FIG. 8) projecting through suitable openings in the plates 32 and 33 which are peened thereto for securing the frame 94 to the plates. Other lugs 99 (FIGS. 3 and 8) are provided to space the plates 32 and 33 from the walls of the case 10.

Spaced from the horizontal leg of the L-shaped piece 95 is an L-shaped shunting frame 101 of magnetizable material comprising a vertical leg and a horizontal leg, the upper end of the tube 93 extending through the horizontal leg thereof, and the vertical leg of the frame 101 being to the right of the vertical leg of the L-shaped piece 95. The horizontal leg of the frame 101 is also soldered to the tube to mechanically connect the two and the vertical leg has ears 103 (FIG. 8) turned at a right angle and disposed between the plates 32 and 33.

The armature device 45 is a shunting armature and is pivotal about a pin 104 having its ends extending through aligned openings in the ears 103 (FIG. 8) and the plates 32 and 33. The shunting armature 45 is of magnetizable material and has the general shape of an M tipped on its side, the central portion of which has ears 105 providing bearings through which the pin 104 extends. The lower end of the shunting armature 45 is biased, as illustrated in FIGS. 5 and 6, counterclockwise into abutment with a stop or cross piece 107 of non-magnetizable material, the latter extending between the plates 32 and 33 and is in abutment with the horizontal leg of frame piece 95. Also, the cross piece 107 extends to the left beyond the vertical leg piece 95. The central portion of the shunting armature 45 is close to the vertical leg of the shunting frame 101, the distance therebetween being sufficient only to allow the shunting armature 45 to pivot freely. The pin 104 is held stationary by a spring 108 coiled firmly about one end and having its legs crossed and about one of the lugs 98. Another spring 109 is coiled about the pin 104 and between the ears 105 and has one end in a slot 111 in the pin and other end bearing against the armature, to bias the shunting armature 45 counterclockwise against the cross piece 107.

The cross piece 107 also limits movement of the main armature 44 since the upper legs 35 of the inner armature body 46 of the main armature 44 are biased by one end of the armature spring 52 (coiled about pintle 87) into abutment with the lower end of the shunting armature 45, FIGS. 6, 7 and 9, the other end of the spring 52 being received in a slot at one end of the pintle 87. The pintle 87 is held stationary in openings in the spaced frame plates 32 and 33 by a spring 127 (similar to spring 108) tightly engaging the left hand portion of the pintle 87 (FIG. 9) which projects throught the frame plate 32 (FIG. 3) and having its legs crossed and engaging opposite sides of the end of the pin 62 (about which the cradle 60 pivots) which extends through the frame plate 32. As illustrated in FIG. 8, the cross piece 107 has notches 112 to accommodate portions of the side arms 43 of the outer latch 47.

As illustrated, the lower bar 48' is received in notches 110 in the lower legs 38, FIGS. 6 and 7, for actuation upon movement of the legs 38. The notches 110 in the lower side legs 38 which accommodate the lower bar 48' are proportioned so that in the contacts closed position, FIG. 6, only the right hand surfaces abut the right hand surface of the lower bar 48', that is, the side legs 38 transmit the bias of the spring 52 to the lower bar 48' urging it into engagement with the lips 63, at this time. When the inner armature body 46 is pivoted by the electromagnetic flux, for instance, to the position illustrated in FIG. 7, the left hand surfaces of the notches 110 first travel through a small distance, sufficient to allow the inner armature body 46 to attain momentum, and then engage the lower bar 48' the impact moving it out of latching engagement with the lips 63. The left hand surfaces of the notches 110 remain in abutment with the lower bar 48' when the armature body 46 pivots toward the frame, as illustrated in FIG. 7, but at this time the right hand surface of the lower bar 48' is spaced from the right hand surfaces of the notches 110. Upon deenergization of the coil 22, the inner armature body 46 moves through this clearance distance before striking the lower bar 48', turning and biasing it toward latching engagement with the lips 63. It will be noted that rotation of the inner body 46 in the clockwise direction is restrained by the vertical wall of the lips 63.

The width of the shunting armature 45 is such as to freely fit between the side legs 43 (while contacting the upper legs 35 and the cross piece 107) so that no interference results between the side legs 43 and the edges of the shunting armature 45, providing an interfitting arrangement between main and shunting armatures in which the upper part of the main armature device 44 overlies a portion of the shunting armature 45 and the shunting path and a lower part of the shunting armature 45 overlies a part of the main frame. With the foregoing arrangement, the axis of the pintle 104 lies to the right of that of the pintle 87, as viewed in FIGS. 4 to 6. Upon actuation of the main armature device 44, the two armature devices 44 and 45 move together in the manner of meshing gears, about their respective pintles and in opposite directions.

The main armature inner body 46 comprises an interconnecting generally V-shaped body 36, FIG. 9, connecting the lower legs 38 which extend at approximately a right angle to the lower portion of the V-shaped body 36 and the upper side legs 35 which extend generally at the same angle as the upper portion of the V-shaped body 36 for balancing the inner body 46. The upper portions of the side legs 35 are provided with suitable notches to accommodate the upper bar 48 and allow movement of the latter with respect to the inner body 46. Suitable aligned bearings are formed in the side legs 35 and side plates 43 for the common pintle 87.

All of the pivotal members, 45, 46 and 47 are independently balanced about their pivotal axes and the inner body 46 and the outer latch 47 are pivotal relative to each other upon the common pintle 87. As illustrated, the closest part of the main armature inner body 46 to the main frame 94, defining a small air gap, is immediately adjacent the pintle 87, at the apex of the V-shape, and both parts of the inner body 46 flare away from the main frame on both sides of the pintle 87 to prevent magnetic binding with the frame 94. The outer latch 47 is preferably formed of non-magnetizable material and has a small mass compared to the inner body 46. In any event, all portions of the outer latch 47 are well spaced from the frame 94.

The shunting frame 101 and the upper L-shaped piece 95 are magnetically closed by the core 91 which in the open position of the contacts extends through both members, as illustrated in FIG. 4. When the core 91 is fully in, that is, has moved downwardly the maximum amount, the core 91 extends through the horizontal leg of the lower L-shaped piece 95, as illustrated in FIG. 7. It will be noted that during movement of the core 91, after the upper end of the core 91 passes the horizontal leg of the shunting frame 101, a gap starts to be formed which increases in size as the core moves while the gap between the forward end of the core 91 and the horizontal leg of the L-shaped piece 94 decreases, increasing the magnetic attraction of the lower main magnetic circuit while decreasing the magnetic attraction of the upper, shunting circuit.

From the foregoing it is seen that when the coil 22 is energized at about rated current or below, two magnetic circuits are established, the core 91 being biased, at this time, to the top of the tube, FIG. 6. The main magnetic circuit, at this time, is from the lower L-shaped frame piece 96 through the vertical leg thereof and across the large air gap to the inner main armature body 46, from the inner main armature body 46 generally across the small air gap between the apex of the V-shape and the vertical leg of the upper frame piece 95 from the horizontal portion of the upper frame piece 95 to the forward portion of the movable core 91, and across the large air gap back to the lower frame piece 96. A second, shunting magnetic circuit exists at this time from the movable core 91 through the upper L-shaped upper frame piece 95 and the latter's vertical leg generally across the small air gap between the apex of the V-shape inner main armature body 46, from the upper end portion of the armature body 46 to the shunting armature 45, and through the shunting armature 45, across the small air gap to the vertical leg of the frame 101 and back to the movable core 91. Since the main circuit comprises two large air gaps and one small gap, the latter common to the shunting circuit also which further includes another small gap only, the magnetic flux is shunted through the upper magnetic circuit and the magnetic attraction in the lower circuit is insufficient to actuate the main armature device 44.

However, when the current in the coil 22 rises above a predetermined value between for instance, 110 to 125% and 2,000% of rated current, the magnetic flux in the lower magnetic circuit becomes sufficient to start movement of the core downward, against the upward spring bias and the retarding action of the fluid in the tube 93. As the core moves downwardly, the gas between its forward portion and the horizontal leg of the frame piece 96 decreases, and the strength of the lower main magnectic circuit increases until it is sufficient to attract and pivot the main armature body 46 into abutment with the frame to overlie the space between the vertical legs of the L-shaped pieces 95 and 96.

The magnetic coupling between the inner armature body 46 and the shunting armature 45 produces a magnetic restraint upon movement of the armature body 46 which together with the bias furnished by the armature spring 52 prevents actuation of the inner body 46 until a sufficient magnetic attraction exists to overcome the restraint and the spring bias. This sufficient magnetic attraction will exist instantaneously above a predetermined overload current or at overload currents below this predetermined amount after a time delay period (due to the spring bias on the core 91 and the retarding action of the fluid within the tube 93) depending on the amount of overload.

At overload currents above 2,000% of the rated current, the magnetic flux in the main magnetic circuit is sufficient to instantly actuate the main armature device 44 and thus instantly actuate the circuit breaker. It has also been found that by varying the spring bias on the shunting armature, the current value at which instantaneous tripping will take place can be raised or lowered between 1,200 and 2,000% of rated current. The spring bias is varied by rotating the pin 104 after the springs have been assembled thereto, to a new fixed position.

A pin 126 is carried by the movable arm 15 and projects therefrom to limit collapse of the mechanism under pressure of the reset spring 83 for maintaining the catch link 55 biased against the lock pin 58, upon automatic resetting of the mechanism (FIG. 5) subsequent to engagement of the lip 63 with the lower bar 48'.

Thus, upon the occurrence of the predetermined overload, the contacts 12 and 14 will open, either instantaneously or at the end of a time delay period, depending upon the overload, due to the magnetic flux and the pivoting of the main armature device 44 in the counterclockwise direction, whereby the cradle 60 is released by the bar 48' and the main armature device 44 pivots (about its supporting pintle 87) against the bias of spring 52, the latter tending to urge the lower bar 48' into engagement with the cradle 60 due to the coaction of the lower legs 38 and the bar 48'. The cradle 60 rotates due to the spring force upon the lock pin 58 from the opening spring 28, the spring bias being transmitted by the toggle links 64 and 70 to the catch link 55.

The linkage moves to the momentary position illustrated in FIG. 4 and then automatically resets to the open contacts position illustrated in FIG. 5.

Referring to FIG. 4, after the cradle 60 rotates sufficiently, toward the position illustrated in dot-dash lines, the toggle links 64 and 70 under pressure of the spring 28 move the catch link 55 and simultaneously the movable arm 15 moves to the fully open position, abutting the stop plate. Between the release of the catch link 55 by the lock pin 58 and the attainment of the position of the catch link 55 illustrated in FIG. 4, the cradle 60 (due to the bias of the spring 88) returns to the position illustrated in FIG. 5, from that in dot-dash lines in FIG. 4, that is, toward latching engagement with the lower bar 48'. If the lower bar 48' has already returned to the open position of the contacts due to the bias of the spring 52 on the main armature inner body 46, the surfaces 66 depress the lower bar 48' sufficiently for the lower bar 48' to slip into engagement with the lips 63. If the lower bar 48' has not already returned, upon its subsequent return it will simply enter into engagement with the lips 63, but the parts are proportioned so that the latching engagement between cradle 60 and the lower bar 48' takes place before the catch link 55 attains the position illustrated in FIG. 5. The main armature is rotated toward the lips 63 by the spring bias on the main armature inner body 46, the lock pin 58 meanwhile returning to the top of the slots 59 due to the spring 61.

After the linkage moves upwardly its maximum amount, the reset spring 83 moves the link 70 toward the movable contact 14, pivoting about the pintle 73. This pivotal motion causes the catch link 55 to rotate downwardly clockwise about the pintle 51, and the handle link 50 to be pivoted by the cross link 75 so that the handle 40 is carried to the right or to the off position of the contacts. The back, rounded part of the nose 57 depresses the lock pin 58 (against the bias of the spring 61) and slips behind the lock pin 58, and the circuit breaker mechanism is now in the position illustrated by FIG. 5.

Should the position of the pin 126 on the movable arm 15 with respect to the link 70 be such that in movement to the off position the nose 57 comes to rest in a spaced position below the lock pin 58, counterclockwise movement of the cradle 60 is limited by abutment of the upper right hand end portions thereof with the coils of the armature spring 52. In this instance, the upper edge of the lower armature bar 48' is spaced from the horizontal portions of the lips 63 while the vertical portions of the lips 63 are in engagement with the left hand surface of the lower bar 48' tending to and turning the latter slightly toward the main frame 94 against the bias of the spring 52, the vertical portions of the lips 63 being made longer than the space between the upper edges of the right hand portions of the cradle and the coils of the armature spring 52, as illustrated.

Thus, two armatures and two magnetic circuits have been provided for producing a time delay before actuation of the circuit breaker linkage at excessive overload currents and instantaneous tripping of the circuit breaker at very high overload currents.

Having described this invention, I claim:

1. In a circuit breaker an electromagnet comprising a hollow tube, a core enclosed by said tube and movable from one end to the other of the tube, said core being biased to one end of the tube, a coil about a part of the tube, a main frame about said coil and a part of said tube, an armature attractable to said frame by the magnetic flux, and a shunting frame for shunting the magnetic flux of said coil.

2. In a circuit breaker the combination comprising an electromagnet including a hollow tube, a coil wrapped about a portion of said tube, a magnetically permeable core within said tube biased to one end of said tube and movable from this end to the other end, a main frame about said coil and a portion of said tube, said main frame defining a space, a main armature movable toward the main frame upon a predetermined current to bridge said space, a shunting frame spaced from one end of the main frame and about the portion of the tube not occupied by the main frame, and a shunting armature pivotally disposed between the main armature and the shunting frame to complete a magnetic shunting flux path.

3. In a circuit breaker the combination of stationary and movable contacts, a mechanism for actuating the movable contact, an electromagnet comprising, a frame, a coil, a tube, said tube including a movable core biased to one end of the tube, said coil surrounding a portion of the tube only, an armature attractable toward the coil upon a predetermined current, said armature including means to latch said mechanism, said armature being biased toward the latching position, a shunting frame about an end of said tube, and a shunting armature disposed between said shunting frame and said main armature for completing a magnetic flux path between the shunting frame and the main armature when a portion of the core is between the shunting frame and the first mentioned frame.

4. The structure recited in claim 2 and further including means for biasing said shunting armature to the position where it completes the magnetic flux path between the main armature and the shunt frame.

5. The structure recited in claim 4 wherein the biasing means is adjustable.

6. The structure recited in claim 2 wherein said main armature comprises first and second members pivotally mounted on said frame, one of said members being attractable toward said frame upon the predetermined current, said first member impinging on the second member to rotate the second member, a linkage mechanism for opening and closing the circuit breaker, said second member having an end portion for latching said linkage mechanism.

7. In a circuit breaker the combination comprising an electromagnet including a tube, a coil wrapped about a portion of said tube, a magnetizable movable core within said tube biased toward one end of said tube and movable toward the other end, a main frame about said coil and a portion of said tube, a main armature having a portion movable toward the frame upon predetermined current, a shunting frame spaced from one end of the main frame and about a portion of the tube not occupied by the main frame, and a pivotal shunting armature disposed between the main armature and the shunting frame, said main and shunting armatures having abutting end portions forming a magnetic coupling.

8. The structure recited in claim 7 and further including biasing means for urging said armature ends into abutment with each other, the biasing means on the shunting armature being variable.

9. The structure recited in claim 7 and further defined by spacing the abutting ends of said armatures from the frames.

10. In electromagnetically operated mechanisms an electromagnet comprising a coil and a movable magnetizable core operable therein, a first means defining a main flux path, a second means defining a secondary flux path, and pivotal main and secondary armatures defining parts of said flux paths, said armatures having adjacent end portions in magnetically coupling relation, whereby movement of the main armature is restrained by the secondary armature.

11. The structure in claim 10 and further defined by said adjacent end portions of said armatures being spaced sufficiently from the remainder of said means to prevent magnetic binding of said armature end portions therewith.

12. In a circuit breaker an electromagnet comprising a hollow tube, a core enclosed by said tube and movable from one end to the other of the tube, said core being biased to one end of the tube, a coil about a part of the tube, a main frame about said coil and a part of said tube, an armature attractable to said frame by the magnetic flux, and a shunting armature for shunting the magnetic flux of said coil.

13. The structure recited in claim 1 and further defined by said core being biased toward a position in which a portion is in the magnetic circuit of said main frame and said armature and another portion of the core is in the magnetic circuit of said shunting frame.

References Cited by the Examiner
UNITED STATES PATENTS

| | | | |
|---|---|---|---|
| 2,491,643 | 12/49 | Burks | 317—189 |
| 3,081,387 | 3/63 | Smith | 200—103 |

LARAMIE E. ASKIN, *Primary Examiner.*

JOHN F. BURNS, *Examiner.*